US006729773B1

United States Patent
Finona et al.

(10) Patent No.: US 6,729,773 B1
(45) Date of Patent: May 4, 2004

(54) FIBER OPTIC FLAT RIBBON CABLE STRAIN RELIEF

(75) Inventors: Michael Santos Finona, Lake Forest, CA (US); Wilbur Samuel Cisneros, Santa Ana, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/285,779

(22) Filed: Nov. 1, 2002

(51) Int. Cl.⁷ ................................................. G02B 6/36
(52) U.S. Cl. ........................................................ 385/86
(58) Field of Search ........................... 385/86, 87, 100, 385/114, 136, 137

(56) References Cited

U.S. PATENT DOCUMENTS 6,264,374 B1 * 7/2001 Selfridge et al. ............. 385/78

* cited by examiner

Primary Examiner—Javaid H. Nasri
(74) Attorney, Agent, or Firm—Roger C. Turner

(57) ABSTRACT

A strain relief apparatus which is especially useful with a standard fiber optic connector (10) having a cylinder backshell (12) with a pair of rearwardly-projecting arms (20, 22) that hold circular clamp elements (24, 26) to clamp to a circular optical fiber cable, which facilitates clamping to a fiber optic flat ribbon cable, or flat cable (40). A flat cable adaptor (50) has a groove (82) with front, rear, and middle groove portions (84, 86, 90) each of rectangular cross-section for receiving the flat cable. A jacket (94) of compressible material of about one inch length is wrapped around the flat cable and lies in the groove middle portion. Only the jacketed part of the flat cable is firmly pressed against the bottom wall (114) of the groove to clamp the flat cable to the adaptor. In one adaptor device, two identical adaptors (52, 54) are used, which form a circular recess (62) that receives the clamp elements. In another device, only a single adaptor (130) is used, with the jacketed cable portion (94) projecting above the top face of the adaptor, and with a wrap (150) such as a heat shrink sleeve tightly wrapped around the jacket and the adaptor.

15 Claims, 3 Drawing Sheets

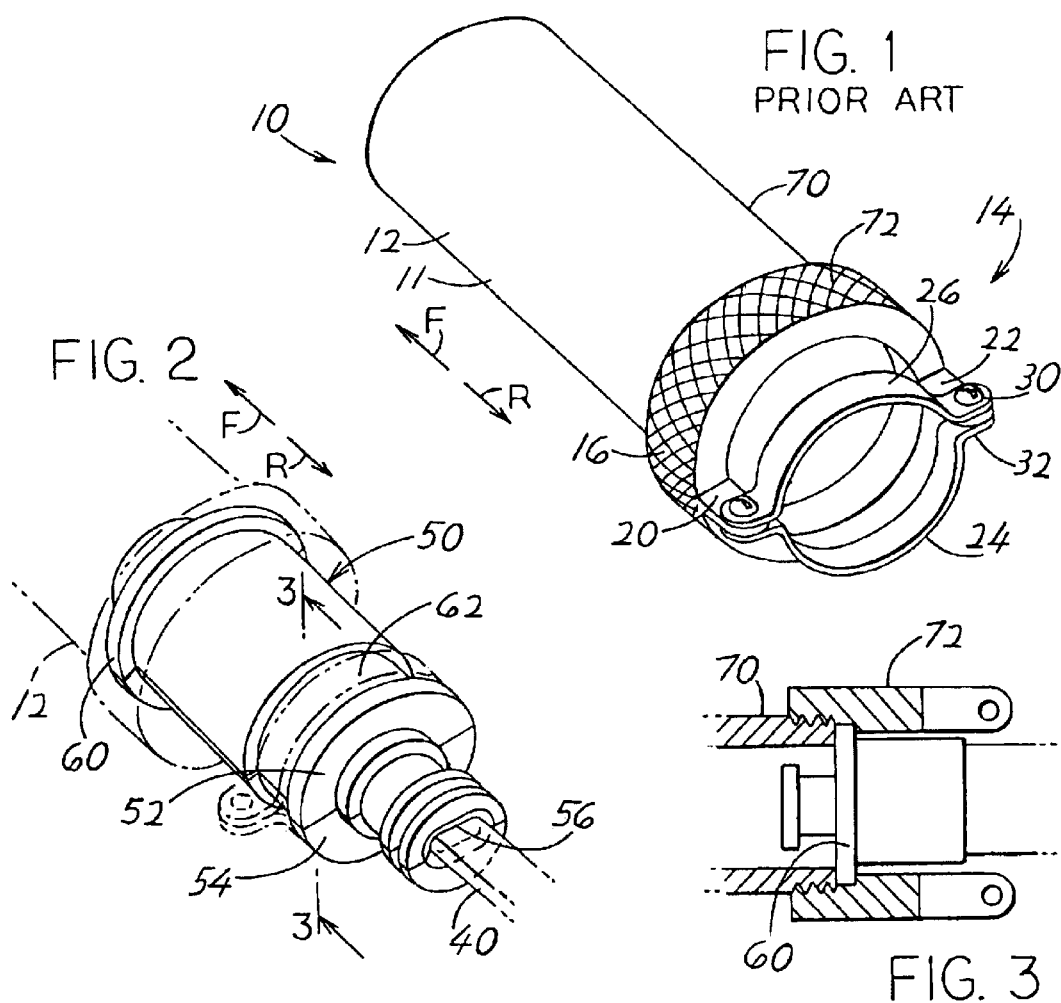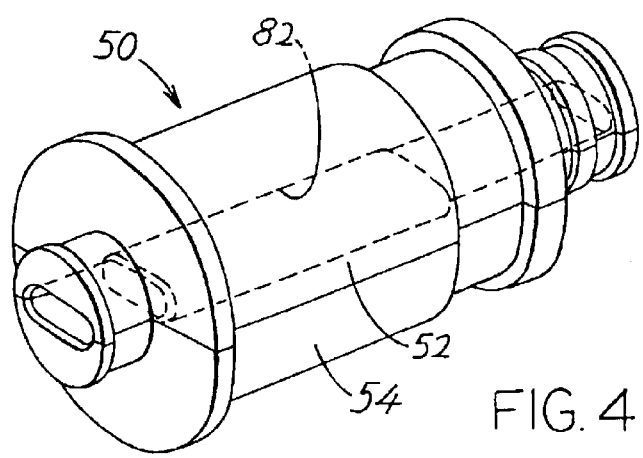

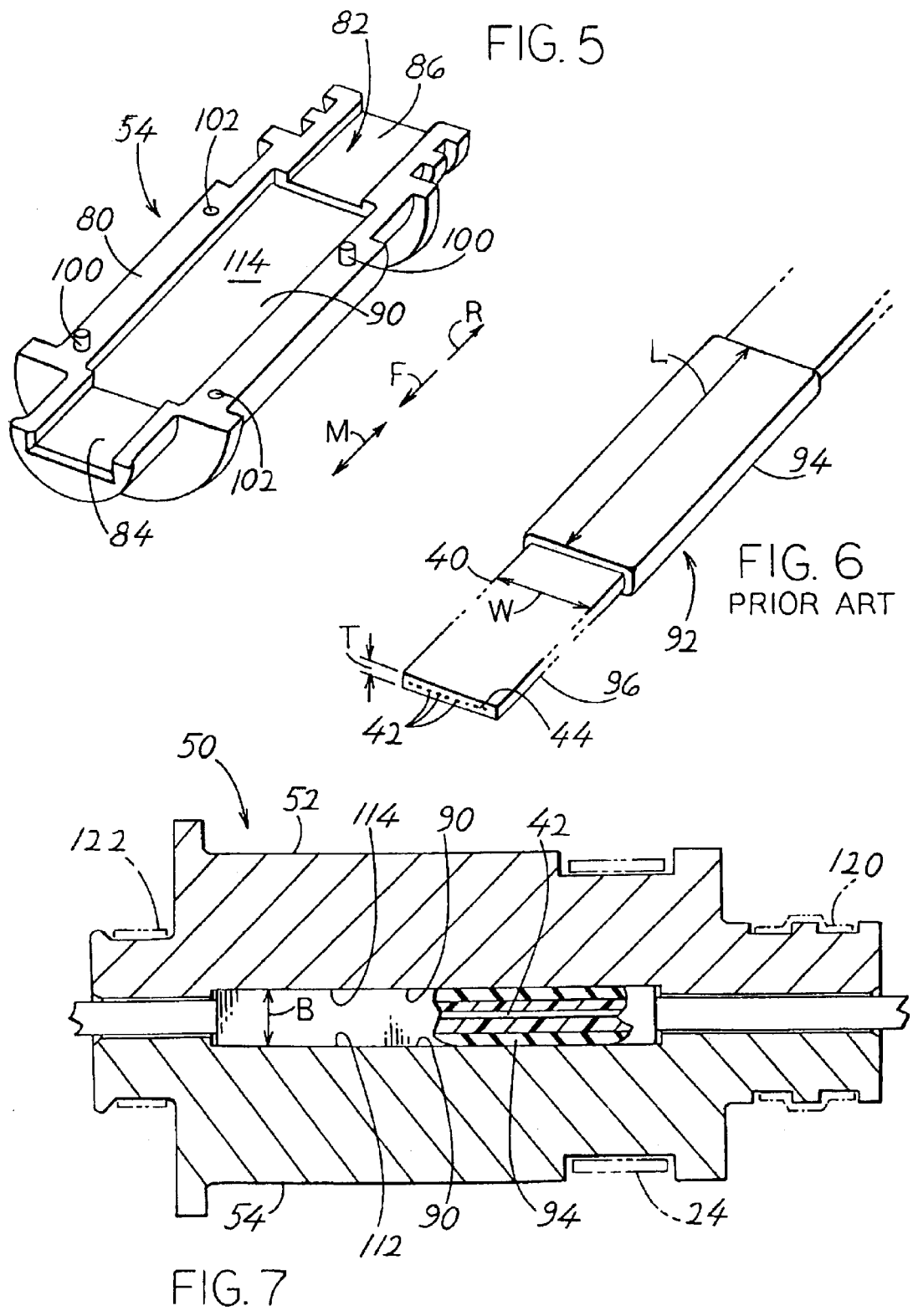

FIBER OPTIC FLAT RIBBON CABLE STRAIN RELIEF

BACKGROUND OF THE INVENTION

One type of standard fiber optic connector, which is commonly used in military applications, includes a cylindrical backshell and a strain relief mechanism formed by a pair of circular clamp elements lying at the rear ends of a pair of arms. When a circular fiber optic cable is used, the circular clamp elements are placed one above and the other below the circular cable and clamped to the cable.

Fiber optic flat ribbon cables have been found to provide many advantages over circular cables, as in providing easy splitting of the cable to route fibers in different directions. It would be desirable if an adaptor were available that could provide strain relief for fiber optic flat cables, using the existing backshell apparatus that was originally designed for clamping fiber optic circular cables. Such adaptor should retain all parts of the existing backshell apparatus.

SUMMARY OF THE INVENTION

In accordance with one embodiment of the present invention, a strain relief apparatus is provided, that furnishes strain relief for a flat optical cable, and especially when used with a standard fiber optic connector that has a cylindrical backshell and a pair of circular clamp elements for lying at the ends of arms to clamp to a circular fiber optic cable. The adaptor has a top face with a longitudinally-extending groove having front, rear, and middle portions. The flat cable is provided with a jacket that fits in the groove middle portion, the groove middle portion having a slightly greater width than the end portions to closely receive the jacket on the cable. The flat cable is clamped in place by forces applied downwardly against the jacket to clamp it against the bottom of the groove middle portion.

In one adaptor construction, the adaptor includes two identical adaptor elements that each forms a groove with middle and end portions. When the two adaptor elements are brought together, they clamp the jacketed cable portion between them. The two adaptor portions form a circular groove around themselves, which receives the circular clamp elements of the standard fiber optic connector.

Another adaptor includes a single adaptor element with a groove having front, rear, and middle groove portions that receive a cable with a jacket tightly wrapped around it. The jacketed cable portion is tightly pressed down by a wrap that extends around the rest of the adaptor, a shrink wrap sleeve being preferred. The single element adaptor has a front end with a pair of slots on either side that receive the arms of the standard connector. The circular clamp elements are held in place by placing one on top of the single adaptor element and the other on the bottom of the single adaptor element and holding them in place with screw fasteners.

The novel features of the invention are set forth with particularity in the appended claims. The invention will be best understood from the following description when read in conjunction with the accompanying drawings.

BRIEF DESCRIPTION OF THE DRAWINGS

FIG. 1 is a rear isometric view of a standard connector of the prior art.

FIG. 2 is a rear isometric view of a flat cable adaptor of the present invention, shown installed in the circular cable connector of FIG. 1, but with the circular cable connector being shown in phantom lines.

FIG. 3 is a partial sectional view taken on line 3—3 of FIG. 2, but with all parts shown in solid lines.

FIG. 4 is a front isometric view of the adaptor of FIG. 2.

FIG. 5 is a front isometric view of one adaptor element of the adaptor of FIG. 4.

FIG. 6 is an isometric view of a flat cable assembly, showing a jacket surrounding a flat optical cable.

FIG. 7 is a sectional side view of the adaptor of FIG. 4, with the flat cable assembly installed therein.

DESCRIPTION OF THE PREFERRED EMBODIMENTS

Figure 8:
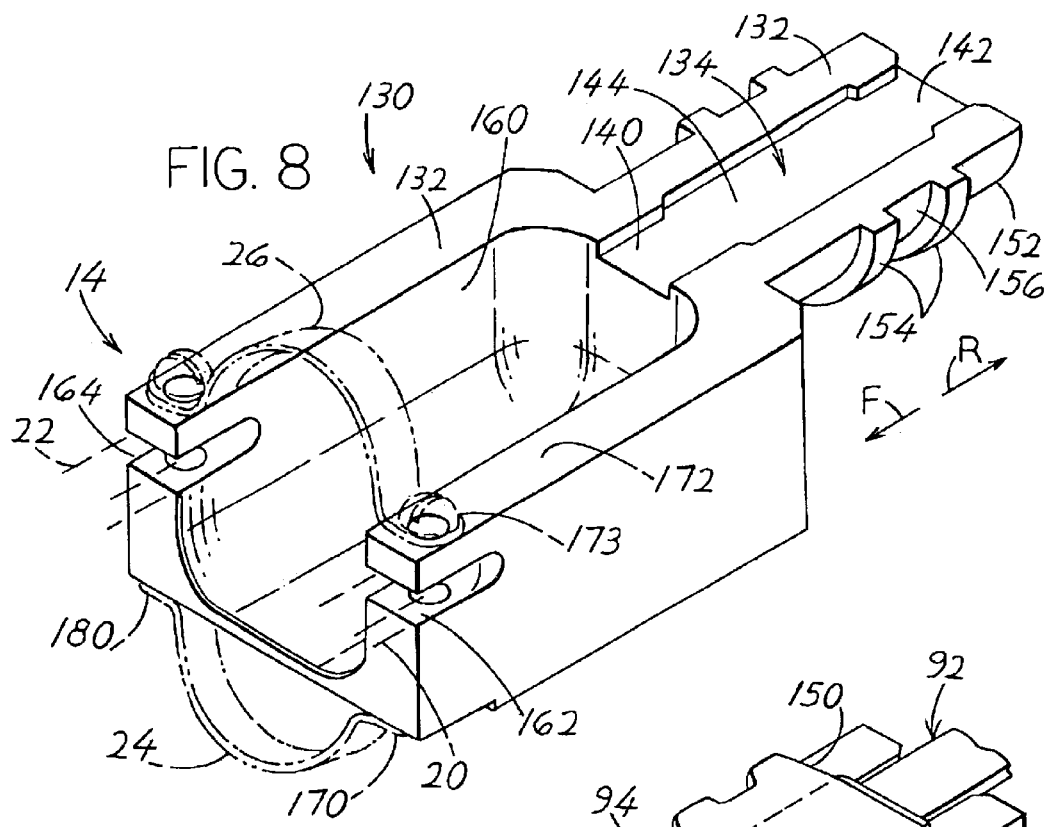
FIG. 8 is an isometric view of a strain relief apparatus of another embodiment of the invention, with the circular clamp elements in place thereon.

FIG. 1 shows a prior art fiber optic connector 10 with a housing 11 that includes a backshell 12 with a mechanism 14 for clamping to a cylindrical fiber optic cable to provide strain relief. The mechanism includes a member 16 with a pair of rearwardly R extending arms 20, 22 that have holes in their rear ends. The mechanism also includes a wrap formed by a pair of circular clamp elements 24, 26 that are mounted on the rear ends of the arms and which can be tightened around a cylindrical cable by tightening a pair of screws 30 that engage threaded holes in flanges 32 of the lower circular clamp element 24. Many fiber optic connectors of the construction 10 are in use, especially in military applications.

More recently, fiber optic flat ribbon cables, or flat cables 40 shown in FIG. 6, have been adopted for connection to fiber optic connectors. The flat cable 40 has numerous thin fibers 42 that are each of a diameter such as 0.1 mm, encased in a flexible sheet 44 having a thickness T such as 0.075 inch and a width W such as 0.370 inch for a flat cable having twenty-four fibers. One of the many advantages of the flat flexible cable is that it can be cut along its length to separate some fibers from other so as to differently route them. The flat cable 40 of FIG. 6 can be used with the prior art connector 10 of FIG. 1, but strain relief must be provided so that any pulling forces on the cable 40 are transmitted to the backshell 12 rather than to the termini connected to the front ends of the fibers. The mechanism 14 should be retained so that the connector 10 can be used to connect to a prior cylindrical cable without requiring access to removed parts of the mechanism 14.

In accordance with one embodiment of the present invention, applicant provides an adaptor of the construction shown in FIG. 2 at 50 to provide strain relief for the flat cable 40 of FIG. 6. The adaptor includes two adaptor elements 52, 54 that form a passage 56 between them that receives and clamps to the flat cable. The adaptor forms a front flange 60 for mounting in the backshell 12. The adaptor also forms an exterior circular recess 62 that can be attached to the mechanism 14 of FIG. 1 to stabilize the adaptor 50 and to keep the mechanism 14 in place. FIG. 3 shows that the front flange 60 of the adaptor is trapped between shell members 70, 72 when the shell member 72 is screwed onto the shell 70.

FIG. 5 shows a first 54 of the adaptor elements, the other adaptor element being identical, or substantially identical.

The adaptor element 54 has a top surface 80 which is flat, and has a groove 82 in the top surface. The groove extends longitudinally M, or in front F and rear R directions through the entire length of the adaptor element. The groove has front and rear groove portions 84, 86 and a middle groove portion 90. The flat cable 40 of FIG. 6 is part of a flat cable assembly 92 which includes a jacket 94 having a length L on the order of magnitude of one inch, that surrounds the flat cable. The jacket 94 is formed of compressible material and is bonded tightly against the outside of the flat cable 40. In one example, where the width W of the flat cable is 0.370 inch and its thickness T is 0.075 inch, the thickness of the jacket 94 is 0.020 inch. The thickness of the cable assembly is 0.115 inch at the jacket. The jacket is formed of a polyolyfin, which is compressible by more than 3% of its thickness without damaging the cable, and which is an elastomer. A front portion 96 of the cable that extends forward of the jacket 94 should have a length on the order of magnitude of 3 inches to reach and extend through termini of the connector. Applicant places the flat cable assembly 92 of FIG. 5 in the groove 82 of the adaptor element of FIG. 5. It is noted that the front and rear groove portions 84, 86 each have a width that is only slightly greater than the width W of the cable, such as 0.2 mm wider. The middle groove portion 90 has a width about the same as that of the jacketed cable, such as 0.420 inch to leave only a slight clearance on either side. The thickness of the cable assembly at the jacket 94 is preferably at least 5% greater than the thickness of the flat cable.

After the flat cable assembly 92 is placed in the groove 82 of the adaptor element 54, the identical upper adaptor element 52 is placed over the lower 54 and they are pressed together. A pair of alignment pins 100 of one element are received in a pair of bores 102 of the other element. FIG. 7 shows the two elements 52, 54 assembled. The distance A between the bottom walls 110, 112 of each end portion is slightly greater than the thickness T (FIG. 5) of the flat cable 40, to avoid directly clamping the flat cable. However, the distance B between the bottom walls 112, 114 of the middle groove portions 90 are slightly smaller than the thickness of the cable with the jacket 94 of FIG. 5 around it. The interference between the thickness of the jacketed part of the cable and the thickness B between bottom walls of the two groove middle portions, is about 0.005 inch. This results in secure clamping of the adaptor 50 to the jacket 94. The fact that the jacket 94 is at least partially composed of elastomeric material (material having a Young's Modulus of no more than 50,000 psi) enables secure clamping without excessive pressure on the optical fibers 42 that could break them.

The circular clamp elements 26 of FIG. 1 are clamped around the circular recess shown at 62 in FIG. 2. This allows the entire clamp mechanism 14 of FIG. 1, which was previously used to clamp to a circular fiber optic cable, to remain intact. In addition, the circular clamp elements 24, 26 hold the two adaptor elements 52, 54 tightly squeezed together to clamp to the jacket 94. Applicant prefers to provide shrink sleeves 120, 122 (FIG. 7) at the opposite ends to clamp those ends together.

Figure 9:
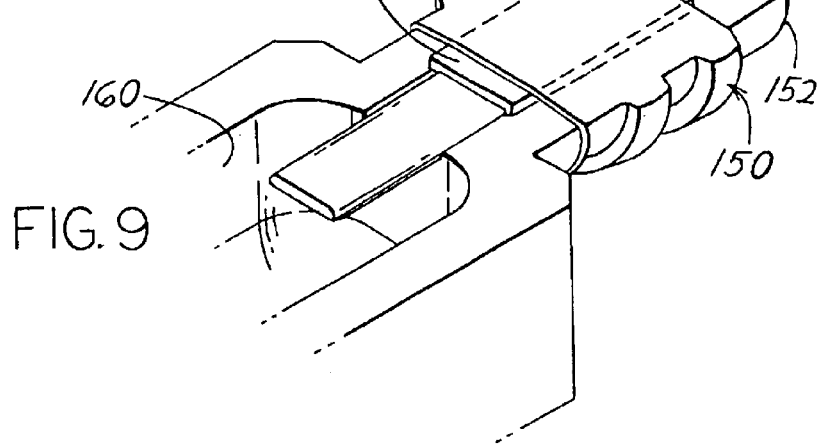
FIG. 9 is a view of a portion of the adaptor of FIG. 9, with the flat cable assembly of FIG. 6 installed thereon and clamped in place.
Figure 10:
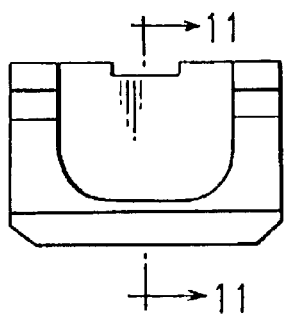
FIG. 10 is a front elevation view of the adaptor of FIG. 8.
Figure 11:
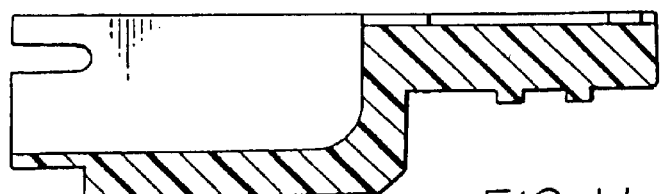
FIG. 11 is a sectional side view taken on line 11—11 of FIG. 10.

FIG. 8 illustrates another adaptor 130 which applicant has designed as an alternative, to provide strain relief for an optical fiber flat cable while keeping the mechanism 14 of the prior art fiber optic connector in place. The adaptor 130 has a rear portion 152 with a top face 132, and a groove 134 in the top face that has front and rear ends 140, 142 and a groove middle 144. All of the groove portions have the same depth below the top face 132. As shown in FIG. 9, when the flat cable assembly 92 is laid in the groove, with the jacketed part 94 lying in the groove middle portion, a wrap 150 is wrapped around the jacket 94 and around the adaptor end portion 152 to hold the jacket tightly in place. Applicant prefers to use a heat shrink tube as the wrap 150, although a flexible band with a tightenable retainer can be used. The adaptor rear portion 152, which has the groove 134, has flanges 154 forming a slot 156 that holds the shrink tube or any other wrap in place against sliding rearwardly off the adaptor. A cavity 160 lying forward of the groove 130 provides room for bending of the cable.

The adaptor 130 has a front end with a pair of slots 162, 164 that receive the arms 20, 22 (FIG. 1) of the prior art circular cable strain relief mechanism 14 of FIG. 1. The lower and upper circular clamp elements 24, 26 are laid against the bottom and top surfaces 170, 172 of the adaptor and are held in place by a pair of screws 173. Each screw has a head at the top and extends down through a bore in the adaptor and through holes in the arms 20, 22 of the prior mechanism 14, and are threaded into threaded holes in flanges 180 of the lower circular clamp element 24.

While applicant has used terms such as "top", "bottom", etc. to describe the invention as it is illustrated, it should be understood that the adaptors and other parts can be used in any orientation with respect to the Earth.

Thus, the invention provides a strain relief adaptor for a fiber optic flat ribbon cable, or flat cable, which securely holds the flat cable. The adaptor preferably can be mounted on a prior art connector with a mechanism designed to clamp to a circular fiber optic cable, and attach to all parts of that mechanism. The adaptor includes at least one adaptor element with a groove having a width a plurality of times its height. The groove has front and rear portions and a middle portion between them, for receiving a jacket wrapped around a flat cable. It is noted that two or more flat cables can be stacked to serve as a larger flat cable, and the jacket can be wrapped about the stacked flat cable. The flat cable assembly extends through the groove, with the jacket lying in and substantially completely filling (fills over 80%) the groove middle portion. In one embodiment of the invention, two adaptor elements are provided that clamp the jacket between them by the jacket being compressed between the bottom of the groove middle portions. The two adaptor elements form a circular external groove which receives the circular clamp elements of the prior art connector. Another embodiment of the invention includes a single adaptor element with a groove that receives the flat cable assembly, the jacket projecting above the top surface of the adaptor and a wrap, such as a shrink sleeve, extending around the adaptor and tightly pressing against the jacket. In this adaptor, the front end of the adaptor has a pair of slots that receive arms of the prior art mechanism, and the top and bottom circular clamp elements are mounted at the top and bottom of the front end of the adaptor and fastened thereat.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A strain relief apparatus for mounting on a fiber optic connector housing, which provides strain relief for a fiber optic flat ribbon cable, or flat cable, comprising:

a first flat cable adaptor that is fixed to said connector housing and that includes walls forming a first groove for receiving at least one fiber optic flat cable, said first groove having first and second end portions and a middle portion between said end portions, said end portions and middle portion each being of substantially rectangular cross-section, with a width and height wherein the width is a plurality of times the height, and each groove portion has a bottom wall;

a strain relief jacket lying around a portion of the length of said flat cable which can fit into said passage middle portion;

said jacket lying in said passage middle portion and portions of said at least one flat cable extend through each of said passage end portions, said jacket being clamped to walls of said passage middle portion.

2. The apparatus described in claim 1 wherein:

said first flat cable adaptor has a top surface, said first groove being formed in said top surface and said first groove having an open top;

a second flat cable adaptor that includes a lower surface that lies against said first adaptor top surface;

said second adaptor having a jacket-engaging surface portion that presses against said jacket to clamp said jacket between said jacket-engaging surface portion of said second adaptor and the bottom wall of said middle portion of first adaptor passage middle portion.

3. The adaptor described in claim 2 wherein:

said first and second groove end portions each have a depth, and said groove middle portion has a greater depth than either of said first and second passage end portions.

4. The apparatus described in claim 1 wherein:

said first flat cable adaptor has a flat top surface, said groove being formed in said top surface;

a second flat cable adaptor that is substantially identical to said first flat cable adaptor, and that has a second flat surface with a second groove therein;

said first and second adaptors lie with said second adaptor upside down from an orientation of said first adaptor, with the flat surfaces of said adaptors lying facewise against one another, and with said jacket compressed between the groove middle portion bottom walls of said adaptors, but with walls of said groove end portions surrounding said at least one flat cable without compressing it.

5. The apparatus described in claim 1 wherein said apparatus is adapted to mount on a fiber optic connector housing that includes a cylindrical backshell with opposite sides and with a strain relief holder that includes a pair of part circular clamp elements that can clamp to a fiber optic circular cable, wherein:

said first and second adaptors each form about half of a cylindrical groove, and said circular clamp elements extend in said cylindrical groove around said first and second adaptor and clamp said adaptor together.

6. The apparatus described in claim 1 wherein:

said strain relief jacket comprises at least partially elastomeric material of a combined thickness at a top and bottom of said cable that is at least 5% of the vertical thickness of said flat cable.

7. The apparatus described in claim 1 wherein:

said first adaptor has a top surface, said groove being formed in said top surface;

said jacket projects above said top surface; and including a wrap that wraps around a portion of said first adaptor that forms said groove middle portion, said wrap pressing directly against said jacket to hold said jacket to said bottom wall of said groove middle portion.

8. The apparatus described in claim 7 wherein said apparatus is adapted to mount on a fiber optic connector housing that includes a cylindrical backshell with opposite sides and with a strain relief holder that includes a pair of arms extending rearwardly from said opposite sides of said backshell for holding circular clamp elements that can clamp to a fiber optic circular cable, wherein:

said first adaptor has a front end with a pair of slots that receive rear ends of said arms, said adaptor has a pair of vertical holes, said circular clamp elements extend one above and one below said first adaptor rear end, and including a pair of screw fasteners that each projects through holes in said circular clamp elements and through one of said arms and through one of said holes in said adaptor front end.

9. A strain relief apparatus for mounting on a fiber optic connector, and providing strain relief for a fiber optic flat cable assembly of substantially rectangular cross-section, comprising:

first and second adaptors which each has a cable-engaging face that lies facewise against the cable engaging face of the other adaptor;

the cable-engaging face of said first adaptor having a groove extending in a longitudinal direction along its length, said groove having opposite end portions and a middle portion;

said groove end portions and middle portion each having a rectangular cross-section with a lateral width and vertical thickness, the lateral width at each end and middle portion being at least twice the vertical thickness thereat to receive said flat cable assembly;

said adaptors being clamped together to clamp said flat cable assembly between them.

10. The strain relief apparatus described in claim 9 including said flat cable assembly, wherein:

said flat cable assembly includes a flat cable and a compressible strain relief jacket extending around said flat cable, along a length on the order of magnitude of one inch;

the lateral width of said groove middle portion is greater than the lateral width of at least one of said groove end portions, and said strain relief jacket is compressed between a bottom wall of said groove middle portion and said second adaptor.

11. The apparatus described in claim 9 including said fiber optic flat cable assembly, wherein:

said flat cable assembly includes said flat cable and a compressible strain relief jacket extending tightly around said flat cable;

the lateral width of said groove middle portion is greater than the lateral width of at least one of said groove end portions, and said strain relief jacket has a width that is greater than the width of said at least one groove end portion.

12. The apparatus described in claim 9 wherein:

said first and second adaptors are substantially identical, each having one of said grooves, said groove middle portion in each adaptor having a greater depth than a depth of each of said groove end portions;

said adaptors have an outside surface that forms an external groove, and including a wrap that lies at least partially in said groove and that wraps about said adaptors and holds them tightly together.

13. A strain relief apparatus for mounting on a fiber optic connector, and providing strain relief for a fiber optic flat cable assembly of substantially rectangular cross-section, comprising:

an adaptor that has a substantially flat upper surface with a groove, said groove having front and rear groove end portions and a groove middle portion;

said flat cable assembly includes a flat cable and a strain relief jacket wrapped about a limited length of said flat cable;

said flat cable assembly lies in said groove, with said jacket lying in said groove middle portion and projecting above said adaptor flat upper surface;

a wrap that is tightly wrapped around said adaptor and said jacket.

14. The apparatus described including 13 wherein:

said groove middle portion has a greater width than said groove rear end portion, and said jacket fits closely in said groove middle portion so it cannot readily slide rearward out through said rear end portion.

15. The apparatus described in claim 13 wherein said fiber optic connector has a cylindrical backshell with opposite sides and a pair of arms extending rearwardly from said opposite sides for holding circular clamp elements that can clamp to a circular fiber optic cable device, and wherein:

said adaptor has a forward end with opposite sides that form a pair of slots that receive said arms and a pair of vertical holes;

said circular clamp elements each have opposite ends forming laterally-extending flanges with holes;

said adaptor forward ends have vertical through holes at their opposite sides, and including a pair of fasteners that each projects through one of said circular clamp element flanges of each clamp element and through one of said holes in the adaptor.

* * * * *